(12) United States Patent
Mossbarger

(10) Patent No.: US 7,169,051 B1
(45) Date of Patent: Jan. 30, 2007

(54) PLAYER CONFIDENCE POINTS METHOD AND SYSTEM OF IMPLEMENTATION IN A MULTIPLAYER SOFTWARE APPLICATION

(76) Inventor: Tim Mossbarger, 915 5th Ave. North, Great Falls, MT (US) 59401

( * ) Notice: Subject to any disclaimer, the term of this patent is extended or adjusted under 35 U.S.C. 154(b) by 740 days.

(21) Appl. No.: 10/616,652

(22) Filed: Jul. 9, 2003

(51) Int. Cl.
A63F 13/00 (2006.01)

(52) U.S. Cl. ....................................................... 463/42
(58) Field of Classification Search .................... 463/1, 463/42, 43
See application file for complete search history.

(56) References Cited

U.S. PATENT DOCUMENTS

| | | | |
|---|---|---|---|
| 5,816,920 A | 10/1998 | Hanai | 463/42 |
| 6,106,399 A | 8/2000 | Baker et al. | 463/42 |
| 6,296,487 B1 | 10/2001 | Lotecka | 434/118 |
| 6,746,332 B1 * | 6/2004 | Ing et al. | 463/42 |
| 2003/0177187 A1 * | 9/2003 | Levine et al. | 709/205 |
| 2003/0204565 A1 * | 10/2003 | Guo et al. | 709/205 |
| 2004/0242321 A1 * | 12/2004 | Overton | 463/29 |

* cited by examiner

Primary Examiner—Kim Nguyen
(74) Attorney, Agent, or Firm—Shane P. Coleman; Holland & Hart LLP

(57) ABSTRACT

A method and computer software system are disclosed for using points in a massive multiplayer online gaming (MMOG) software application that performs functions for players of the application based on usable points associated with each of the players. Meta-points are allocated to a first player. Usable points are then allocated to a second player, as directed by the first player. The amount of usable points allocated to the second player is specified by the first player and is related to the amount of the first player's meta-points. Functionality is enabled within the application for the second player based on the amount of the second player's usable points. In one embodiment, a rating system is used in connection with the allocation of usable points to the second player, such that players with higher ratings receive more usable points than do players with lower ratings.

22 Claims, 5 Drawing Sheets

PLAYER CONFIDENCE POINTS METHOD AND SYSTEM OF IMPLEMENTATION IN A MULTIPLAYER SOFTWARE APPLICATION

FIELD OF INVENTION

The present invention relates generally to computer software games. More particularly, it relates to massive multiplayer online gaming (MMOG) systems and a system and method for allocating points to players within the game.

BACKGROUND

A massive multiplayer online game (MMOG) allows multiple players to simultaneously play a computer software game together, through computer terminals connected by a network, such as the Internet. The player terminals may connect to a central server that executes software modules of the MMOG. MMOG software applications generally simulate an environment and allow as many as hundreds or thousands or more players to participate in the virtual simulation concurrently. Players may log into and out of the game simulation at will, but the MMOG simulation continues to exist as players come and go, regardless of the number of players actively participating. The players may be allowed to communicate with each other and sometimes work cooperatively to achieve objectives within the game. Within the simulation, the players have the ability to affect other players through their actions. Various types of MMOG applications are well known in the art.

One problem with such games is that they provide no means of assessing the character traits of other players. The virtual environment provides no means for simulating verbal and non-verbal interaction between players. As a result, current gaming systems fail to hold players accountable for their actions that occur within the game. A newer player has little, if any, basis for evaluating fellow anonymous players, and existing players receive little, if any, recognition based on their conduct during the game. What is needed is a method of improving interaction between players within an MMOG software application.

SUMMARY

A method is disclosed for using points in a massive multiplayer online gaming (MMOG) software application that performs functions for players of the application based on usable points associated with each of the players. Meta-points are allocated to a first player. Usable points are then allocated to a second player, as directed by the first player. The amount of usable points allocated to the second player is specified by the first player and is related to the amount of the first player's meta-points. Functionality is enabled within the application for the second player based on the amount of the second player's usable points.

A method is also disclosed for using points associated with players in an MMOG application. Discrete ratings are received for a first player from other players using the application. The discrete ratings are combined to create a combined discrete rating for the first player. The combined discrete rating for the first player is compared to a specification for a game. Game functionality is enabled for the first player based on the comparing.

A tangible, computer-readable medium is also disclosed. The medium has stored thereon computer-executable instructions for performing a method of using points in an MMOG software application that performs functions for players of the application based on usable points associated with each of the players. An amount of meta-points is allocated to a first player in the application. An amount of usable points is allocated to a second player, as directed by the first player. The amount of usable points allocated to the second player is specified by the first player and is related to the amount of the first player's meta-points. Functionality is enabled within the application for the second player based on the amount of the second player's usable points.

SUMMARY OF DRAWINGS

The detailed description will refer to the following drawings, wherein like numerals refer to like elements, and wherein.

DETAILED DESCRIPTION

A player confidence points system is disclosed that enables players of a computer game to reward other players based on the other players' performance in the game. The system is illustrated in the context of an MMOG "simulation," which refers to any virtual environment in which players can interact with each other and with the virtual environment that operates according to the MMOG software application. By way of example, the virtual environment may present a fictitious or imaginary world, with land, buildings, fauna, and flora, or it may instead apply to a re-creation of historical or current environments in a virtual setting. In the system, players place confidence in other players (through acknowledgement of skillfulness) within the game by allocating confidence points, as described herein. The system may be implemented to create incentives for players to form groups, organizations, and larger in-game social/control structures that will be able to induce larger in-game constructive play (in terms of goal scope and achievement) than might otherwise occur.

Figure 1:
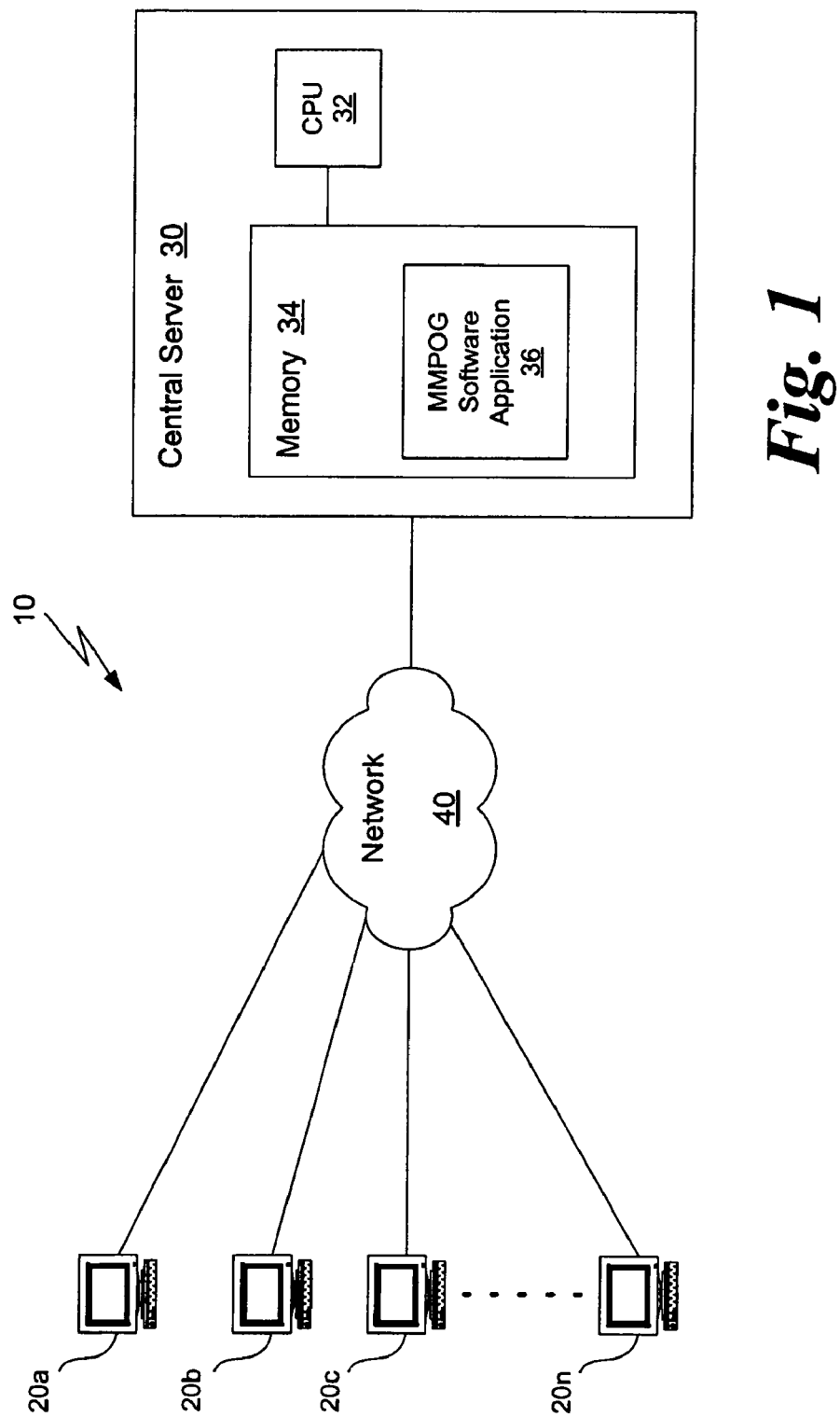
FIG. 1 shows a block diagram of a computer system that implements the confidence method and system.

FIG. 1 is a block diagram of a network 10 of player computer terminals 20a, 20b, 20c, 20n accessing a central server 30 that maintains the virtual environment of an MMOG software application 34. Each of the terminals 20a, 20b, 20c, 20n is used by a player (not shown) of the game. The central server 30 may comprise one or more separate servers, located in one or more physical locations, that maintain the virtual environment of the game. In the example of FIG. 1, the central server 30 includes a memory 34 that stores MMOG software modules 36 (also referred to herein as the "game" or "MMOG application") that maintain the virtual environment. The central server 30 in the example of FIG. 1 also includes a central processing unit (CPU) 32 that accesses the memory 34 and executes instructions from the MMOG software modules 36 to maintain operation of the virtual environment. The player computers 20a, 20b, 20c, 20n connect to the central server 30 via a network 40, such as the Internet. In use, the MMOG application 36 allows the players to affect each other through a player points and rating system described herein.

Figure 2:
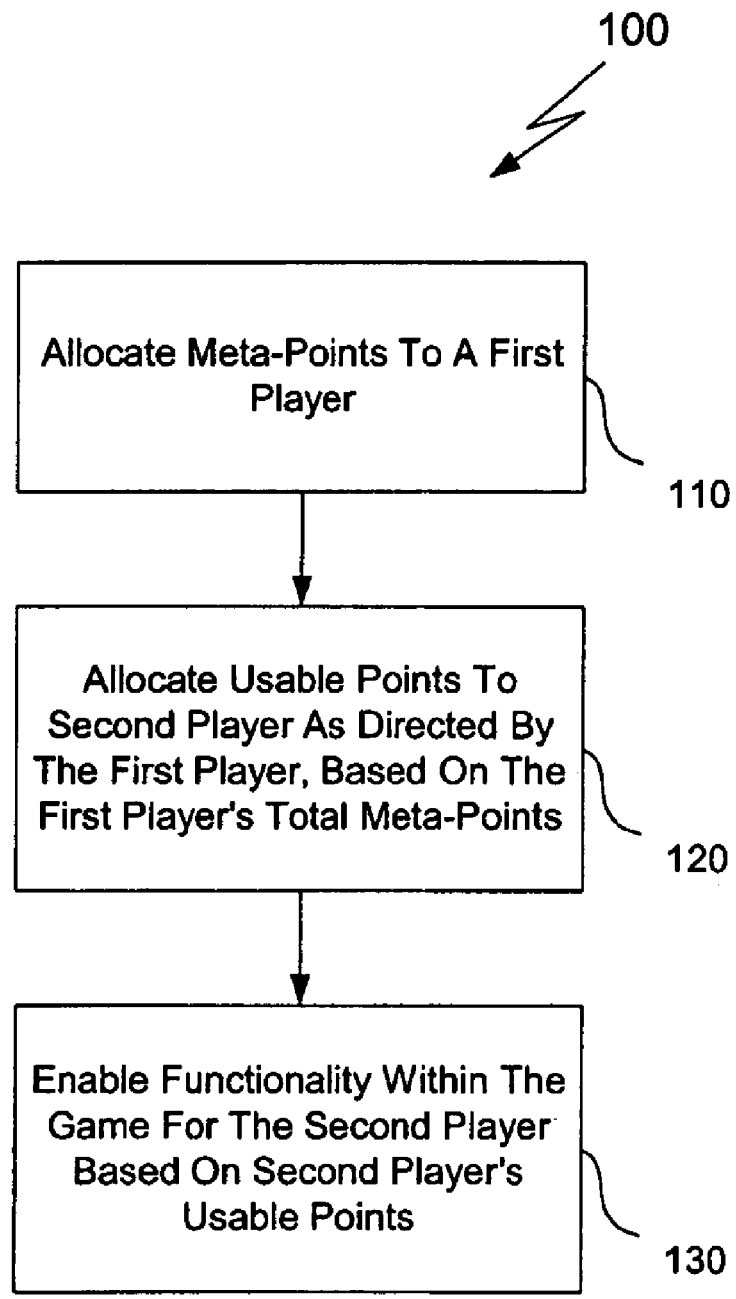
FIG. 2 is a flow chart of one implementation of the method using points as currency.

FIG. 2 is a flow chart of one method 100 of implementing the player points system in the MMOG application 36. In the embodiment described in FIG. 2, the points system uses a currency-based system of allocating points to players and allowing the players to use those points in various ways within the game 36, by exchanging the points for in-game effects. In this embodiment, the MMOG application 36 tracks player points and allows the players to expend the points within the environment.

For each player, the MMOG application 36 tracks two types of points: "meta-points" and "usable points." Usable points are those points that can be used by a player within the game 36. The use of usable points will vary based on the nature of the particular game 36 and its virtual environment. By way of example, a player may be able to "purchase" tools or functionality in a particular MMOG application 36 in exchange for usable points. In a fighting game where the players control action characters engaged in a virtual battle, for example, players may be able to exchange their usable points for enhanced weapons or other fighting powers. In another example, the MMOG application 36 may include numerous levels or portions of the game 36, and players may be permitted to advance to a next level or enter restricted portions of the game 36 only upon accumulating a specified amount of usable points or upon "buying" entrance to the area through the expenditure of their usable points.

Meta-points are points that cannot be used by the player earning the meta-points for gain in the MMOG application 36, but are accumulated and controlled by the earning player, and can be used to create usable points for another player. Each player accumulates meta-points, but cannot use his or her own meta-points. Rather, the meta-points may only be given by the earning player to other players (or groups of players), who can use them as usable points. In one embodiment, described further herein, meta-points are converted to usable points on a one-to-one basis when they are transferred from a first player (e.g., 20a in FIG. 1) to a second player (e.g., 20b in FIG. 1). The use of meta-points and usable points allows players to affect each other within the virtual environment. This allows players to reward other players based on their actions within the virtual environment. Those players who impress other players though their actions will likely receive more usable points from fellow players than would those players who are less well-liked by their peers.

As shown in FIG. 2, meta-points are allocated 110 to a first player. Meta-points may be allocated in several ways. In one embodiment, meta-points are accumulated by players over time, such as the amount of real time a player is participating in the game 36. In another embodiment, meta-points are allocated when the player accomplishes an action or when a particular event occurs. In still another embodiment, meta-points do not accrue, but rather are fixed to a certain value for each player, or are set at a fixed aggregate value for all players in the game 36.

In the first example of meta-point accrual, meta-points are allocated over time to a player in direct proportion to the amount of real time the player spends in the game 36. For example, a player might accumulate meta-points at a rate of ten points per minute of play in the game 36. Each player might receive meta-points at this same fixed rate in one example. This ensures that each player, regardless of background, skill, or other factors has an opportunity to receive meta-points. In another embodiment, each player instead accrues meta-points at a rate that is independent of whether that player is logged into the simulation. In this embodiment, players accumulate points based on passage of real time, rather than on virtual time spent in the game 36.

In another embodiment, meta-points are allocated based upon players' actions within the game 36. For instance, accrual may be based on the number of opponents killed in a combat game, areas explored in an adventure game, or any other such metric-based upon player performance. As an example, when one player designates that they wish to assign rating meta-points to another player, they might receive a certain number of meta-points to do so. One skilled in the art will recognize that the specifics of this allocation embodiment depend upon the specifics of the MMOG application 36.

Another embodiment of meta-points accrual treats meta-points as a fixed value throughout the game 36. In this embodiment, meta-points are neither created nor destroyed. New players to the game 36 may or may not be allocated a fixed amount of meta-points upon beginning play in this embodiment. A player would instead transfer some amount of the player's available meta-points to another player at step 110 of the method 100 described herein with respect to FIG. 2. The recipient player would then accumulate usable points based upon the amount of meta-points that other players had assigned to the recipient player, as explained further herein. Alternatively, a first player's own meta-points may be converted to usable points available to the first player at a fixed rate, for example on a daily or hourly basis.

Usable points are allocated 120 to a second player as directed by the first player 20a and as limited by the first player's total meta-points. For example, meta-points may be converted to usable points on a one-to-one ratio, and the first player may direct that some or all of the first player's meta-points be allocated to the second player for use by the second player as usable points. In one embodiment, the transfer 120 is direct from a first player to a second player. In another embodiment, the transfer is indirect, such that the first player allocates the meta-points to a group of players that in turn allocates points to its constituent members.

The transfer of meta-points can be done in various ways. In one embodiment, meta-points are directly transferred from one player or group of players to another player or group of players in a discrete block of meta-points. This can be done directly with the transferring player specifying a numerical value for the amount of meta-points to be transferred or by selecting a percentage of available meta-points to be transferred. This embodiment gives a transferring player control over how meta-points are transferred to a receiving player or entity.

In another embodiment, meta-points are transferred based on periodic allotments. In this way, meta-points are transferred periodically using percentages or fixed quantities of meta-points in each transfer. This embodiment might be implemented, for example, where the game 36 uses a more implicit confidence system, because this embodiment could hide much of the confidence system's detail from players (such as how often meta-points are created and distributed). A variation of this embodiment increases the value of meta-point transfer if the transferring player does not change the allotment over some period of time. A recipient player is designated to receive points from a first player, and the amount of received usable points increases based on the time elapsed since the designation. In this way an allocation would become "mature" and would provide more points than if the allocating player frequently changed his or her allocations. This embodiment would encourage players to choose their allocation recipients carefully so that they change recipient players infrequently.

In an alternative embodiment, meta-points are partially transferred directly using the two above-stated examples and partially based on in-game events to add an element of strategy or additional flexibility to the implementation of a confidence points system. For instance, by requiring some of a player's meta-points to be transferred upon association with a group of players or interaction with another player (or players), the spirit of a game's confidence point system may be more accurately achieved in some MMOG applications.

The conversion of meta-points into usable points can take various forms. The details of the conversion implementation depend upon the specific dynamics, balancing, and theme of the MMOG application 36. One example of conversion is a one-to-one correspondence between meta-points and usable points. In this embodiment, a one-time transfer of ten meta-points by a transferring player would be converted to ten usable points that could be expended or used to accomplish in-game effects by the receiving player or group of players. In this example the amount of transferred meta-points becomes the amount of usable amount of points. Alternatively, the initial meta-points by may be multiplied by a factor (N), returning usable points of N times the meta-points input.

Another example represents a group conversion of meta-points into usable points. In this embodiment, a group of players' usable points depend upon the number of players in the group, a fixed multiplier of meta-points, and the amount of initial meta-points transferred to the group. In one embodiment, larger groups are assessed a greater amount of usable points than smaller groups for the same amount of meta-points, representing the synergies of larger societies. In one embodiment, an upper boundary is set for the amount of usable points that are generated per meta-point input.

One embodiment converts meta-points (M) to usable points (C) according to the equation: $C=MN(X-1)/X$, where C is the number of usable points received by the recipient player; M is the number of meta-points transferred to the recipient player; X is the number of players within a group to which the recipient player belongs; and N is the conversion factor for converting meta-points into usable points.

In this embodiment the amount of usable points approaches the product of the multiplier (N) and the meta-points (M) as the size of the group (X) increases. For small values of X (representing small groups) the amount of meta-points (M) leads to a reduced amount of usable points (C) as compared to a large group with a greater value (X). In this example, larger groups would benefit in terms of conversion efficiency as compared to the efficiency of conversion of smaller organizations. Also "groups" of only one player (i.e., X=1) would receive no usable points from a meta-points transfer. This embodiment prevents two players from trading points with only themselves, to the exclusion of others.

Functionality within the game 36 is enabled 130 for the recipient player based on the recipient player's usable points. Converted meta-points can be utilized or expended directly by the receiving player or group to further progress in the game 36. The implementation details of the exact expenditure or use of usable points will vary depending upon the specific implementation of the game 36.

In one embodiment, usable points may be used as a currency, such that usable points may be used by the recipient player in any way that reflects general usefulness. Usable points are used as a medium of exchange. Usable points may be directly expended by the recipient player to achieve short-term effects, may be used to purchase or use virtual services or utilities, may be exchanged for virtual items, may be expended to upgrade virtual entities, etc. As such, the scope and nature of the expenditures will vary depending upon the specific type of game 36. In this embodiment, usable points may be represented numerically as a commodity that is incremented or decremented with accrual and expenditure respectively.

In one embodiment, if usable points become either too common or too scarce throughout the virtual environment, the usefulness and underlying motivations for confidence currency is greatly damaged, so various mechanisms may be implemented to resolve this. For example, the cost of game effects and utilities may increase or decrease to ensure an accurate portrayal of the virtual environment as a whole. Point currency costs may be implemented to model economic laws of supply and demand within the virtual world. "Prices" (expressed in terms of required amounts of usable points) of effects and utilities may rise and fall with supply of and demand for these effects or utilities.

In another embodiment, usable points are used as a "rank" or "rating" system. Usable points accumulate but are not expended. Instead, usable points accumulation is used as a gauge of a player's or group's sophistication or maturity, and grants passive effects based on the amount of accumulated usable points. For instance, a usable point requirement of 1000 points might be required before allowing a player to access certain areas or levels of the game 36. In another example, a player might be required to accumulate 10000 usable points before forming, joining, or leading a group within the game 36. In these examples, usable points are used passively as a qualifier for access to various aspects of the virtual environment.

In one implementation of an environment using larger player groups, other issues are addressed. First, groups that receive meta-points have a means to convert those meta-points to usable points for the group's own use. In one example, the usable points are used passively by the group to reach group milestones in the group's development (such as building a town hall in a game involving societies with social and political structures). Use of group points might be determined by a single group leader, by a democratic vote of group members, or by a more sophisticated political structure of the group. In another embodiment, usable points are distributed throughout the group to individual members in certain social roles for use at an individual player level. In one embodiment, usable points may not be directly traded between individuals or between separate societies. Only the receiving player or society is allowed to expend/utilize that those usable points, in this embodiment.

Figure 3:
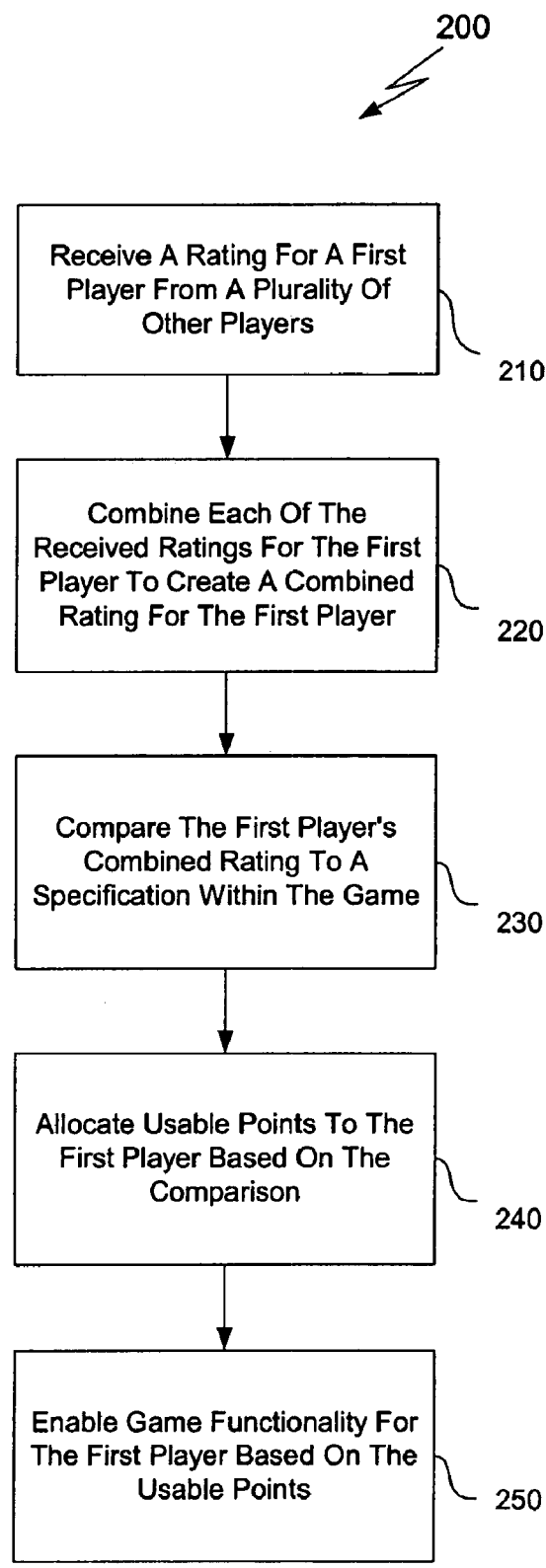
FIG. 3 is a flow chart of another implementation of the method using points within a rating system.

FIG. 3 is a flow chart of one particular embodiment of a method 200 for implementing a confidence point system in an MMOG application 36, allocating usable points based on player ratings. In this embodiment, the MMOG application 36 enables game functionality based on a recipient player's usable points received from fellow players through a rating system. Each player assigns each other player points according to rating limitations, described more fully herein. The game 36 receives 210 a separate rating value for a first player from each of the other players. The first player's separate ratings from each of the other players are combined 220 to create a "combined rating" for the first player. The first player's combined rating is compared 230 to a specification in the game 36. Usable points are allocated 240 to the first player based on the comparison, and game functionality is enabled 250 for the first player based on the usable points. In one embodiment, usable points are allocated based not only on the ratings, but also on the meta-points held by each of the players who assign the ratings, such that players with more meta-points can allocate more usable points. For example, a game 36 may specify that players must have a particular minimum rating in order to perform certain actions within the game 36 or in order to access certain levels or portions of the game 36.

The allocation of points based on a rating system provides the ability to track and maintain accountability for player actions taken in the game 36. This embodiment defines a mechanism that allows one player to view, judge, and act upon the actions of another player within the simulation and have that judgment affect the other player. More skillful players (those with higher ratings) are recognized as such, and are rewarded by other players within the simulation for that achievement through the use of additional abilities, tools, leadership possibilities, etc., resulting from the higher usable points that come with higher ratings.

Figure 4:
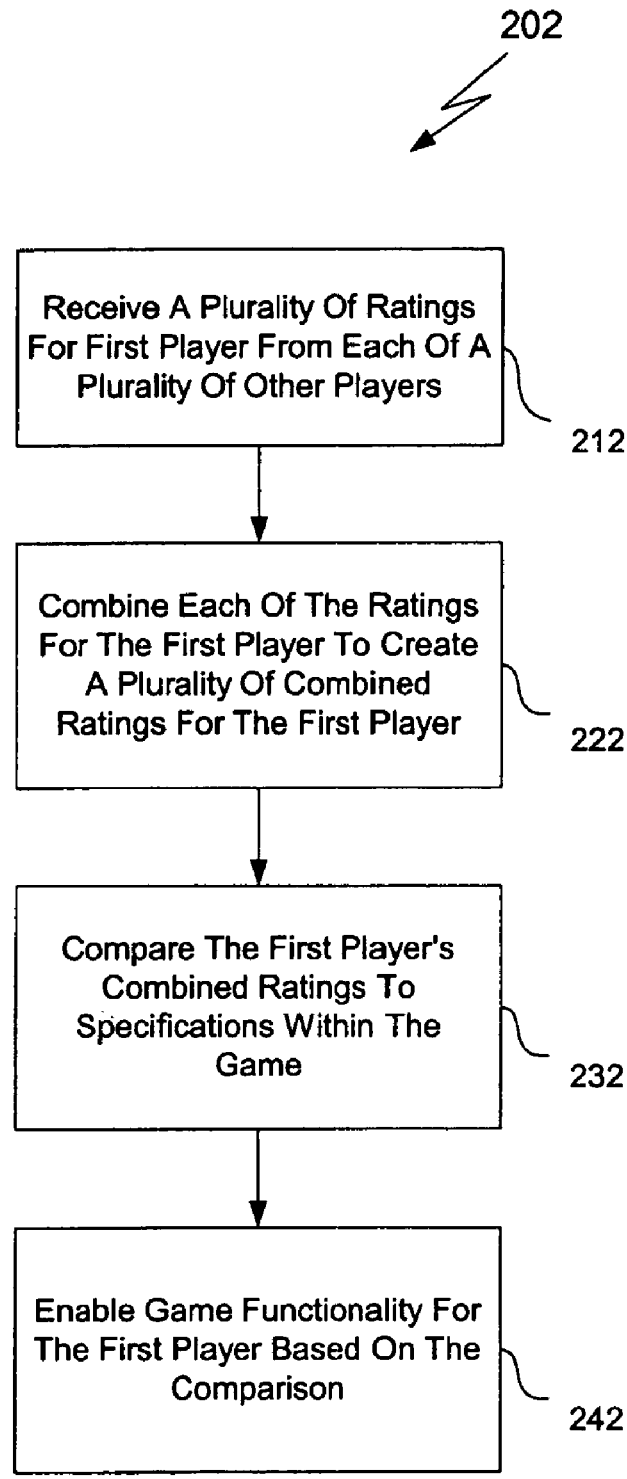
FIG. 4 is a flow chart of another implementation of the method.

FIG. 4 is a flow chart of another implementation of this method 202 using multiple discrete ratings for each player. This example uses multiple discrete ratings for each player to reflect specific types of categories, for each player. Categories of discrete ratings might include, by way of example, personal traits of the player within the game such as leadership, charisma, strength, intelligence, wisdom, etc. Thus, each player has a plurality of discrete ratings. The game 36 receives 212 a plurality of discrete ratings for a first player from each of the other players. The discrete ratings received from the other players are combined 222 to create combined discrete ratings for the first player. The first player's combined discrete ratings are compared 232 to specifications within the game 36. Based on the comparison, game functionality is enabled 242 for the first player.

Game functionality may be enabled 242 by allocating usable points to the recipient player based on the combined discrete ratings for the recipient player. In one embodiment, usable points are allocated to the recipient player according to the discrete ratings. Usable points are associated with discrete ratings such that the recipient player receives different amounts of usable points for different categories, and use of the usable points within the game is limited to functionality also associated with the categories. For example, usable points associated with "Category A" may be used for one purpose in the game, while usable points associated with "Category B" may be used for a different purpose.

In one embodiment, the multiple combined discrete ratings for a player are combined to create an overall player rating, referred to as a "composite rating." In one embodiment, the composite rating is an average or weighted average of the combined discrete ratings. Certain game functionality may be based on the composite rating, for example, by allocating usable points to the recipient player based on the composite rating, as well as restricted usable points for each of the discrete ratings.

Figure 5:
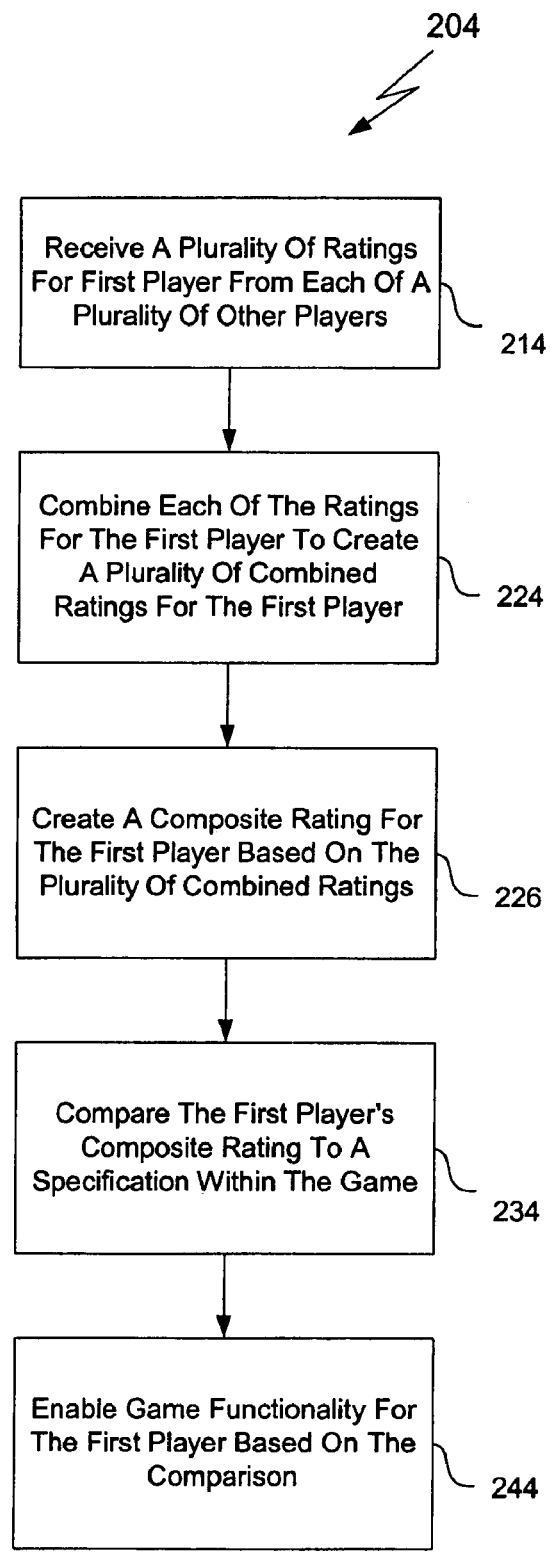
FIG. 5 is a flow chart of another implementation of the method.

FIG. 5 is a flow chart showing an implementation of the rating method 204 using composite ratings. A plurality of discrete ratings are received 214 for the first player from each of the other players. The first player's discrete ratings are combined 224 to create several combined discrete ratings for the first player. Based on the combined discrete ratings, a composite rating is created 226 for the first player. The first player's composite rating is compared 234 to a specification within the game 36. Based on the comparison, game functionality is enabled for the first player.

In one embodiment, the rating is represented as a numerical value within a fixed range of values. This may be a rating on a scale of (e.g., 1 to 100), or may be tracked and displayed with textual terms, such as "average", "above average", etc.

The rating assignment process allows players to assign specific ratings to their peers. In one embodiment, these ratings are restricted to "friendly" players or peers who are working or behaving cooperatively for example by belonging to a common group of players within the game 36. This ensures that players assign values to their peers that reflect ability, so that group members collectively grant leadership and task assignment to other members based on perceived ability, and that players cannot easily abuse the rating system by assigning all negative or detrimental ratings to other players in rival groups.

One embodiment requires players to make decisions as to which particular friendly players receive the highest ratings, rather than allowing all friendly players to assign the highest ratings possible to each other. This embodiment aids players in assigning ratings that accurately portray player ability, such that the most skillful players naturally fill the leadership and key points within groups of players.

One implementation of this embodiment uses a rating system with ratings that are created throughout the game 36 as a limited commodity. This embodiment makes high ratings scores scarce and forces players to assign ratings that are more accurately based on perceptions of other players' skill. To accomplish this, a formula or function is used to limit the available ratings that a player may assign to others. One example measures the number of players within a group, and limits possible ratings for members of the group based on a bell curve or other distribution. This ensures that most players fall within one standard deviation of, and few would fall far from, a pre-determined norm.

Another implementation applies this limiting function to the number of players who have been rated versus the total number of ratable players in the game 36. By way of example, if a first player rates only one other player (a second player) in a system based on global population, the first player might be inclined to assign the second player the highest rating. Instead, this implementation limits the available ratings based on the number of players the first player has already rated. The first player would therefore be limited to assigning an "average" for that rating, unless the first player assigned additional ratings to other players.

In one embodiment, the rating assignment process is flexible insofar as it allows limited changes to ratings. For instance, if no limits were placed on how often a player could change their rating assignments, any rating system would quickly be rendered useless, because players would generally change their assigned ratings based on the expediency of the moment. On the other hand, if no changes were allowed to assigned ratings over time, players who achieve high ratings early in the game would have no incentive to maintain those ratings through positive actions. As such, changes to ratings may be modified over time, but may only be modified incrementally in this embodiment. By way of example, in one embodiment a first player is allowed to increment or decrement his or her ranking of other players periodically. This ensures that players can change their ratings of other players as often as necessary, but must do so slowly. This ensures each player's rating remains somewhat stable. In one embodiment, this increment/decrement process occurs only after an initial rating is assigned or alternatively might be used throughout the game, depending upon the implementation.

Once the discrete ratings have been assigned 214 to a player, the discrete ratings and combined 224 to create combined discrete ratings for each functional area being rated. The combined discrete ratings are used to create 226 a composite rating for the player. This process removes and examines oscillations and aberrant ratings to produce the composite rating that is applicable and accurate in its reflection of the rated player. One embodiment creates 226 the composite rating by calculating the average of all of the combined discrete ratings received. Another embodiment applies statistical tools to the combined discrete ratings to identify trends and to attempt to more accurately portray a player's ability within the game 36. Some discrete ratings or combinations of discrete ratings may weigh more heavily in calculating the composite rating.

One embodiment requires a minimum number of players to assign ratings for a player before establishing a rating for the player. By way of example, ratings from twenty other players might be required prior to the creation of a composite rating for a player.

Rating accuracy pertains to the general cohesion of rating data points, and is closely related to the statistical mode and the standard deviation of that data. For instance, a rating that consisted of 100 total ratings, each which had assigned a value of 50, might yield a more accurate rating then a rating that consisted of 100 total ratings, half of which were 0 and half of which were 100, even though the average is the same for both sets of data. In other words, the data in this case is bimodal, which might imply that there is a problem in the way the ratings are being awarded. Additionally, this data is several standard deviations away from a normal rating for this player, indicating further that the data is possibly erroneous. Bimodal results within a discrete rating may also provide more general feedback concerning the correct operation of the system, assuming that the bimodal results appear in multiple players. For instance, this might imply that the discrete rating in question was really a measure of two separate abilities in the rating players' minds, with half of them measuring the first ability and the other half measuring the second. This might reflect the need to either clarify the use of the discrete rating category itself, or split that rating into two separate discrete rating categories. In one embodiment, the formulas used in the rating assignment process place limits on values a rating player may assign in order to eliminate or minimize data bias. For instance, if the game 36 limits the possible values that a player may receive as a rating to an average of 5 (out of 10), there will correspondingly be no bias present since bias designates a system-wide divergence of data towards one extreme (0) or the other (10). The rating definition process is also used to determine any useful composite ratings. Composite ratings are created by some weighted or un-weighted combination of the combined discrete ratings for use in the rating comparison process described herein. The implementation details of the use of the composite rating will depend upon the particular game 36. In one embodiment, composite ratings are determined by the formula:

$$C=(aR1+bR2+ \ldots +nRn)/T,$$

where C is the composite rating score, R is a combined discrete rating, T is the number of combined discrete ratings being considered, and "a" through "n" are variable weighted multipliers.

The rating system embodiment of the player confidence system compares the combined discrete and/or composite ratings against pre-determined game specifications to enable game functionality, such as special utilities, effects, or tools. This may be done, for example, by allocating usable points to the recipient player based on the composite rating.

As with the currency embodiment described above with respect to FIG. 2, the rating system embodiment can be used in a variety of ways to create useful and productive effects. For example, ratings may be used as a requirement check for access to additional simulation levels, areas, tools, utilities, and effects, etc. In another example, ratings may be used as a multiplier for existing effects, tools, utilities, and other game functionality. In another example, the players' ratings are used as a multiplier for creating usable points for that player whenever usable points are obtained from whatever source.

As a requirements check, ratings may be implemented after normalizing the rating data, as described above. When a player attempts to invoke, use, or access a special feature of the game 36, the game 36 determines whether the player has the required rating. A comparison of the player's rating to the game specifications may be based on rank percentile or deviation. The comparison may occur using the player's composite rating and/or one or more consolidated discrete ratings. A player whose rating meets the requirement is allowed access to the special game functionality. If the player's rating decreases thereafter, all subsequent checks may disallow that player's access to that feature.

As a multiplier, rankings can be used either directly or through some modification to increase or decrease the efficiency and effectiveness of a player's actions. One implementation of player's rankings as a multiplier uses the rating as either a percentile or as a standard deviation from the norm. For instance, players who are two or more standard deviations above the norm might be allowed to achieve efficiency increases of twice that of a unmodified player for certain player actions within the game 36, and a player whose rank was two or more standard deviations below the norm might suffer a fifty-percent decrease in efficiency as compared to an unmodified player. Other systems and methods may be implemented to ensure that poor players' performance do not impose too harsh of a result that would discourage play, in one embodiment.

The confidence points system may be implemented using a combination of the currency and rating systems. In one embodiment, a multiplier to confidence point accrual is applied to players based on the standard deviation of their ranking. Conversely, a multiplier to meta-points accrual may be given to players whose rankings are below average as a consolation or balancing technique.

Although the present invention has been described with respect to particular embodiments thereof, variations are possible. The present invention may be embodied in specific forms without departing from the essential spirit or attributes thereof. It is desired that the embodiments described herein be considered in all respects illustrative and not restrictive and that reference be made to the appended claims and their equivalents for determining the scope of the invention.

What is claimed is:

1. In a massive multiplayer online gaming (MMOG) software application that performs functions for players of the application based on usable points associated with each of the players, a method of using the points, the method comprising:

allocating an amount of meta-points to a first player in the application;

allocating an amount of usable points to a second player, as directed by the first player, wherein the amount of usable points allocated to the second player is specified by the first player and is related to the amount of the first player's meta-points; and enabling functionality within the application for the second player based on the amount of the second player's usable points.

2. The method of claim 1, wherein the step of allocating the amount of usable points comprises allocating usable points based on a conversion factor applied to the meta-points, wherein the conversion factor is based on a rating assigned to the second player by other players.

3. The method of claim 1, wherein the allocating the amount of meta-points comprises allocating based on an amount of real time that has elapsed since the first player first accessed the application.

4. The method of claim 1, wherein the allocating the amount of meta-points comprises allocating based on an event that occurs within the application.

5. The method of claim 1, wherein the step of allocating the usable points comprises:
   receiving a rating for the second player from the first player; and
   allocating usable points to the second player based on the rating and based on the meta-points of the first player.

6. The method of claim 5,
   wherein the step of receiving the rating for the second player from the first player comprises receiving from the first player ratings for a plurality of other players in the game, the plurality of ratings including the rating for the second player, and wherein the plurality of ratings received from the first player are limited based on a bell-curve distribution that prevents the first player from assigning the same rating to each of the other players,
   further comprising receiving:
      a plurality of ratings from the other players for the second player; and
      assigning a composite rating to the second player based on the plurality of ratings received from the other players and the rating received from the first player, and
   wherein the step of allocating the usable points to the second player comprises allocating based on the composite rating.

7. The method of claim 1, wherein the step of allocating usable points comprises:
   receiving a designation of the second player as the recipient, from the first player; and
   allocating usable points to the second player based on an amount of time since the designation was received, wherein the amount of allocated usable points increases as the amount of time since the designation increases.

8. The method of claim 1, wherein the allocating the amount of usable points comprises allocating indirectly to the second player by allocating the usable points to a group and then allocating the usable points among the group members, wherein the second player is a member of the group.

9. The method of claim 8, wherein the converting comprises converting meta-points to usable points using a conversion factor based on a number of members in the group.

10. The method of claim 8, wherein the converting comprises converting meta-points to usable points according to the formula $C=MN(X-1)/X$, where C is the usable points, M is the meta-points, X is a number of members of the group, and N is a multiplier.

11. The method of claim 1, wherein the providing functionality comprises allowing the second player to use the usable points as currency that can be exchanged for functionality within the game.

12. A method of using points associated with players in a massive, multiplayer online game (MMOG), the method comprising:
   receiving a plurality of discrete ratings for a first player from a plurality of other players, wherein the discrete ratings are associated with a rating category;
   combining the discrete ratings associated with common categories to create combined discrete ratings for the first player for each of the categories;
   comparing the combined discrete ratings for the first player to specifications for a game; and
   enabling functionality within the game for the first player based on the comparing.

13. The method of claim 12, wherein the receiving comprises periodically receiving ratings for the first player from one or more of the other players.

14. The method of claim 13, wherein the step of periodically receiving comprises limiting frequency with which the other players can change discrete ratings given to the first player.

15. The method of claim 12, wherein the receiving comprises receiving staggered ratings such that a rating player cannot give the same rating to two players.

16. The method of claim 12, wherein the step of enabling functionality comprises:
   receiving an amount of usable points from another player, wherein the amount of the usable points is based on a conversion factor related to the combined discrete ratings of the first player; and
   permitting the first player to exchange the usable points to enable game functionality.

17. A tangible, computer-readable medium having stored thereon computer-executable instructions for performing a method of using points in a massive multiplayer online gaming (MMOG) software application that performs functions for players of the application based on usable points associated with each of the players, the method comprising:
   allocating an amount of meta-points to a first player in the application;
   allocating an amount of usable points to a plurality of other players, as directed by the first player, wherein the amount of usable points allocated to the other players is specified by the first player and is related to the amount of the first player's meta-points; and
   enabling functionality within the application for the other players based on the amounts of each of the other players' usable points.

18. The medium of claim 17, wherein the step of allocating the amount of usable points comprises allocating the usable points periodically to the other players in a periodic allotment, and wherein the amount of the usable points varies based on a length of time that each of the other players have received the periodic allotments, such that the other players receive more usable points in later periodic allotments than in earlier periodic allotments.

19. The medium of claim 17, wherein the step of allocating the usable points comprises allocating usable points based on a conversion factor applied to the meta-points, wherein the conversion factor is based on ratings assigned to each of the other players.

20. A computer system for performing a method of using points in a massive multiplayer online gaming (MMOG) software application that performs functions for players of the application based on usable points associated with each of the players, the system comprising:

a memory that stores instructions for using points in the MMOG application; and a processor that executes the instructions, wherein the instructions perform a method comprising:

allocating an amount of meta-points to a first player in the application;

receiving a rating for a second player from the first player, wherein the first player is able to assign ratings to a plurality of other players in the application, and wherein the rating is limited by ratings given by the first player to the other players in the application, such that the first player cannot give the same rating to more than one other player; and allocating an amount of usable points to a second player, based on the rating and the amount of meta-points allocated to the first player; and enabling functionality within the application for the second player based on the amount of the second player's usable points.

21. The system of claim 20, wherein the method further comprises:

receiving a plurality of discrete ratings from the first player for the second player; and allocating the usable points to the second player based on the discrete ratings associated with different categories, wherein the usable points are allocated to different categories based on the discrete ratings; and wherein the step of enabling comprises enabling functionality based on the categories associated with the discrete ratings.

22. The system of claim 20, wherein the method further comprises:

receiving a rating for the second player from each of a plurality of other players; and allocating usable points to the second player based on the ratings received from each of the other players.

* * * * *